UNITED STATES PATENT OFFICE.

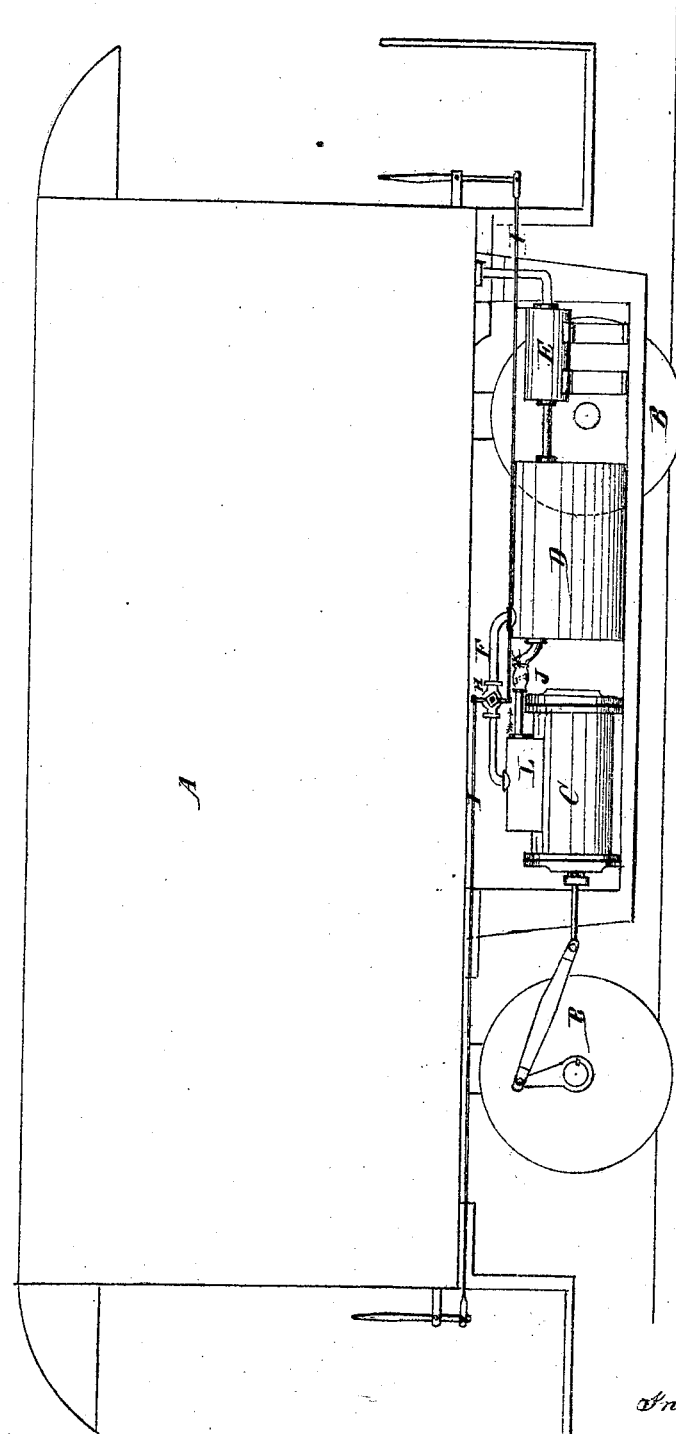

AMOS M. SMITH, OF CHICAGO, ILLINOIS.

IMPROVEMENT IN COMPRESSED-AIR ENGINES.

Specification forming part of Letters Patent No. 117,825, dated August 8, 1871.

*To all whom it may concern:*

Be it known that I, AMOS M. SMITH, of Chicago, in the county of Cook and State of Illinois, have invented a new and original Improvement in Compressed-Air Engines, of which the following is a specification:

My invention consists in providing an auxiliary tank between the main air-tank and the engine, into which the air passes from the main air-tank through an air-governor, said auxiliary tank being connected with the engine in such a manner as to supply it with its propelling air and receive the air pumped thereby, when the engine is reversed, holding the same as a reserved supply power. In the use of portable compressed-air engines it is very desirable to use the momentum of the car or engine to pump air to use to propel the engine, and it is also desirable to pump against sufficient resistance to break or stop the engine; but not enough resistance to cause the wheels to slide on the track.

In the annexed drawing, A represents the main air-tank for holding compressed air. B are wheels, upon which the air-tank is supported; and C, a compressed-air engine, suitably connected with the wheels in any known way for propelling the same. D is the auxiliary air-tank; and E is any well-known governor for regulating the passage of air from the main tank to the auxiliary tank, so that there would be only a certain press of air in the auxiliary tank, regardless of the pressure in the main tank. F is a pipe for conducting air from the auxiliary tank to the engine. It is provided with a suitable valve, H, with connecting-rods I, so that it can be opened and closed from either end of the dummy engine, as shown. J is another pipe connecting the auxiliary tank and engine, as shown, and it is provided with a valve, K, that will admit of air passing from the engine to the tank, but not from the tank to the engine. This pipe is connected to the air-chamber L of the engine in such a way that when the valve H in the pipe F is closed and the wheels B are in motion the engine is converted into an air-pump and pumps the air through the pipe J (the valve K being an ordinary pump-valve suitable for that purpose) into the auxiliary tank D.

It will be observed that, by having a governor, E, between the main tank and the auxiliary tank, the pressure in the auxiliary tank is only sufficient to run the car, although it may greatly exceed that amount in the main tank; but when it is desired to stop the car or engine the valve H is closed, and the engine pumps against the pressure in the auxiliary tank, which is sufficient to soon stop the wheels, but not sufficient to make them slide on the rail; and although the governor allows only air enough to pass into the auxiliary tank to propel the car, the air pumped into the said tank in stopping makes an additional power, which is desirable, or even necessary, in starting.

I do not claim to be the first to use the momentum to pump air through an air-engine into a tank; therefore I do not claim any special way of connecting the auxiliary tank and engine, as any way whereby the air for propelling is conveyed from the tank to the engine and the air pumped by it to the tank may be used. Nor do I claim the governor or air-regulator, but simply use any known governor or regulator.

What I claim, and desire to secure by Letters Patent, is—

The main tank A, the governor or regulator E, the auxiliary tank D, and engine C, when all are arranged on wheels and combined so as to operate substantially as described.

AMOS M. SMITH.

Witnesses:
FRANCIS F. WARNER,
H. F. BRUNS.